United States Patent
Dos Santos et al.

(10) Patent No.: US 8,109,749 B2
(45) Date of Patent: Feb. 7, 2012

(54) DEMOUNTABLE RIGID CORE FOR THE MANUFACTURE OF TIRES COMPRISING RADIUSED LIPS

(75) Inventors: Carlos-Manuel Dos Santos, Clermont-Ferrand (FR); Sébastien Beaugrand, Lempdes (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 51 days.

(21) Appl. No.: 12/677,062

(22) PCT Filed: Sep. 1, 2008

(86) PCT No.: PCT/EP2008/061498
§ 371 (c)(1), (2), (4) Date: Jun. 17, 2010

(87) PCT Pub. No.: WO2009/030667
PCT Pub. Date: Mar. 12, 2009

(65) Prior Publication Data
US 2010/0247696 A1      Sep. 30, 2010

(30) Foreign Application Priority Data
Sep. 6, 2007   (FR) ..................... 07 06291

(51) Int. Cl.
   *B29C 33/76*   (2006.01)
   *B29D 30/12*   (2006.01)

(52) U.S. Cl. ............. 425/54; 156/414; 156/417; 425/55

(58) Field of Classification Search .................... 425/54, 425/55; 156/414, 417
See application file for complete search history.

(56) References Cited

U.S. PATENT DOCUMENTS

| | | | |
|---|---|---|---|
| 1,328,676 A | 1/1920 | Krannich | |
| 1,392,347 A | 10/1921 | Thomas | |
| 3,932,256 A * | 1/1976 | Touchette | 156/417 |
| 4,895,692 A * | 1/1990 | Laurent et al. | 425/54 |
| 5,203,947 A * | 4/1993 | Boeker | 156/417 |
| 5,972,142 A * | 10/1999 | Kuroda et al. | 156/414 |
| 6,113,833 A * | 9/2000 | Ogawa | 425/56 |
| 6,669,457 B2 * | 12/2003 | Scarzello et al. | 425/55 |
| 7,621,308 B2 * | 11/2009 | Lundell et al. | 156/417 |
| 2006/0000554 A1 * | 1/2006 | Kitz et al. | 156/417 |

FOREIGN PATENT DOCUMENTS

| | | |
|---|---|---|
| EP | 0 242 840 | 10/1987 |
| EP | 478271 * | 4/1992 |
| EP | 1 612 033 | 1/2006 |

* cited by examiner

*Primary Examiner* — James Mackey
(74) *Attorney, Agent, or Firm* — Cozen O'Connor

(57) ABSTRACT

A core (N) defining at least partially a manufacturing form whose receiving surface (S), which is of essentially toroidal appearance, is designed to receive directly, by winding, profiles (B) in the form of contiguous bands forming the inside surface of a tire, comprising a plurality of segments (10, 10*d*, 10*i*), each having transverse faces (110*d*, 111*d*, 110*i*, 111*i*), said segments being circumferentially adjacent and located side by side, bearing against each other via their transverse faces, in which core the connecting radius (r) between the transverse face and the receiving surface (S) of a segment (10*d*, 10*i*) is between 0.8 mm and 1.5 mm, along all or part of the length of the edge formed by the intersection of these two surfaces.

4 Claims, 2 Drawing Sheets

DEMOUNTABLE RIGID CORE FOR THE MANUFACTURE OF TIRES COMPRISING RADIUSED LIPS

RELATED APPLICATIONS

This is a U.S. national stage under 35 USC §371 of application No. PCT/EP2008/061498, filed on Sep. 1, 2008.

This application claims the priority of French application no. 07/062191 filed Sep. 6, 2007, the entire content of which is hereby incorporated by reference.

FIELD OF THE INVENTION

The invention relates to tire manufacture. More particularly the invention has to do with assembly, in which an essentially rigid core is used as a support for the manufacture of the tire and as a means for moulding the surface of the inside cavity of said tire. The shape of the core, which is of essentially toroidal appearance, therefore matches the shape of the inside cavity of the tire.

BACKGROUND OF THE INVENTION

Publication EP 1 075 928 describes a rigid core of the type to which the invention relates, which acts as a support for an unfinished tire from the start to the end of its manufacture. This core is made up of multiple segments which are independent of each other so that the core can be extracted in segments from the inside of a tire via the space available between the beads. This core is then put back together again to act as the support for the subsequent manufacture of another tire. A means is used to keep the segments assembled during the manufacture of the tire. Other, earlier publications also describe cores of the same type such as the publication U.S. Pat. Nos. 1,392,347 and 1,328,676, or more recently the publication EP 242 840.

Such a core must withstand numerous cycles of assembly and disassembly and must be extremely robust in order to guarantee a high level of geometrical quality as well as maintaining these qualities for an extended period of time despite the numerous cycles it is put through. Moreover, this core, when used as a means of moulding the inside part of the tire, must withstand high compressive forces. Its mechanical structure is therefore suitable for this type of use, which distinguishes it particularly from conventional supports used for tire manufacture as described for example in the publication U.S. Pat. No. 3,932,256.

In general terms, the core comprises a plurality of circumferentially adjacent segments located side by side in contact with each other via their transverse faces. The transverse faces of at least one segment converge away from the core in order to allow said core to be disassembled by removing this segment radially towards the interior. In practice the core comprises two kinds of segments: divergent segments, whose transverse faces are divergent radially outwards from the core, and so-called reverse segments, whose transverse faces are convergent outwards from the core.

Once assembled, the outer surface of the core constitutes the receiving surface, whose shape is essentially toroidal, and on which the profiled rubbery products are deposited to create the unfinished tire.

It is also known practice to deposit these rubbery products in the form of bands wound circumferentially in a spiral around the manufacturing form. The transverse profile of the bands and the pitch of the spiral define, in a known manner, the cross section of the product which it is wished to deposit at a precise location of the unfinished tire.

As a general rule, therefore, the first product deposited on the manufacturing form defines the inside surface of the tire. It is formed by a winding of contiguous bands made of a material which, once fully cured, is virtually impermeable to air.

The application by winding of the inner band of rubber is performed by a means capable of delivering the band either directly onto the surface of the manufacturing form using a nozzle for example, or from an extrusion station, so that the bands are deposited while still hot, before undergoing a consequent cooling phase. As a result of this, the product is more sensitive to deformations than a colder and stiffer product. In both cases the band is deposited directly on the surface of the receiving manufacturing form either by the extrusion nozzle or using an application means such as a wheel.

Whatever means is used, it has been observed that the first band deposited on the manufacturing form, i.e. the band in direct contact with the manufacturing form, sometimes breaks unexpectedly. These random breakages of the band are disruptive, in that they interrupt the winding cycle and cause substantial loss of time in reconfiguring the station, especially when the application cycle is controlled by automatic means.

SUMMARY OF THE INVENTION

It is an object of the invention to greatly reduce the frequency of manufacturing incidents.

It has been observed that these band breakages usually occur at the join between two segments of the manufacturing form. Closer inspection has shown that, when this has happened, at this particular site the two manufacturing form segments were not flush with each other in the radial direction. This is explained by the constant cycling of assembly and disassembly and by localized wear patches occurring on the transverse faces of the segments as well as on the segment-to-rim locking means. To eliminate this phenomenon, there then follows a long and costly series of maintenance and adjustment operations aimed at ensuring that the outer surface of the manufacturing form, once assembled, no longer has radial misalignments at the joins between the segments.

These adjustment operations may become more and more frequent as the manufacturing form ages, and it is not always possible to completely eliminate this phenomenon, which can even occur when assembling the manufacturing form in an irregular manner during a series of assembly operations regarded as "correct".

In accordance with an embodiment the invention, it has been shown that it is possible to greatly reduce the influence of these misalignments on the application of the first product to the manufacturing form, by ensuring that the edge formed by the intersection of the transverse face and the receiving surface of a segment has a slight radius along all or part of its length. In practice, it has been determined that the value of said radius must be between 0.8 and 1.5 mm, and preferably be approximately equal to 1 mm.

More generally, the technical problem solved by the invention arises in an identical manner for all of the means designed to receive a first layer formed by winding a band of rubbery material onto it. These means consist of an assembly of a plurality of circumferentially adjacent segments arranged side by side in contact with each other, bearing against each other via their transverse faces. These segments define as a general rule, once assembled, a receiving surface whose shape is a torus. However, without departing from the spirit of the invention, these segments may also be of a cylindrical shape.

BRIEF DESCRIPTION OF THE DRAWINGS

The following description is based on the normal implementation of the invention, namely a toroidal shape, and refers to FIGS. 1 and 2, in which.

DETAILED DESCRIPTION OF THE DRAWINGS

Figure 1:
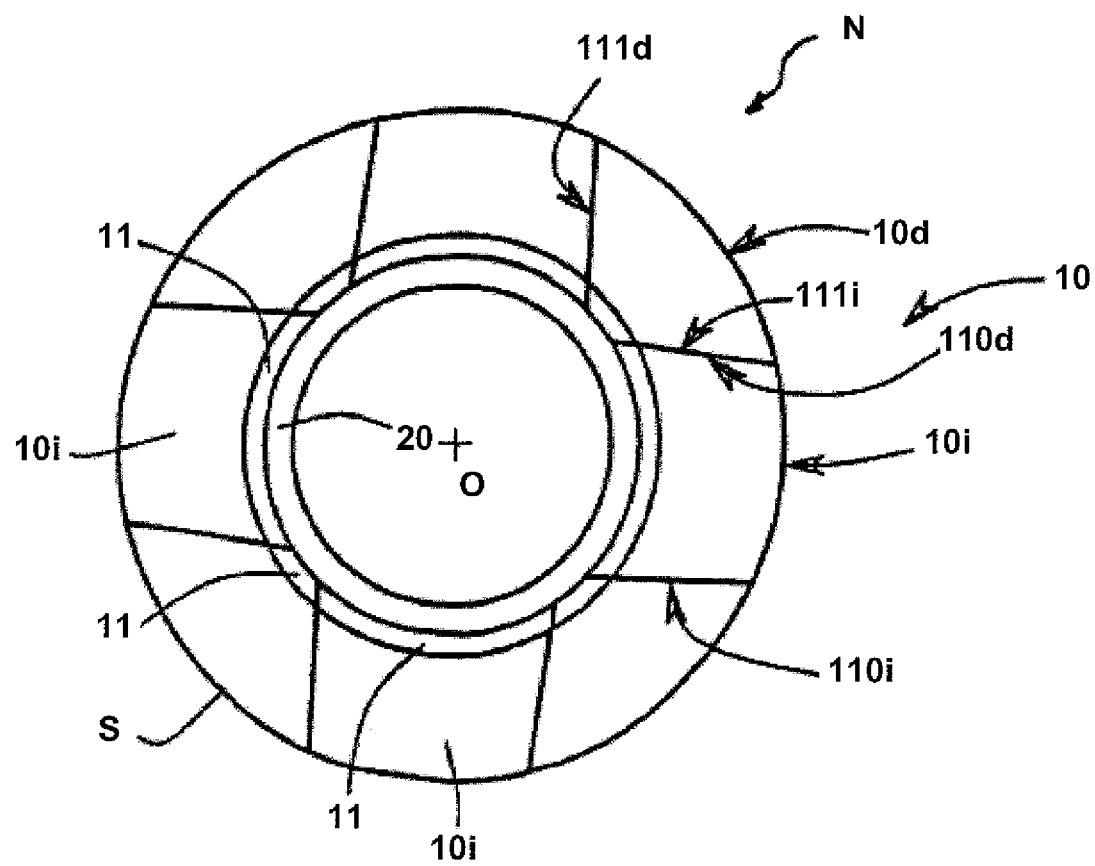
FIG. 1 is a view of a core in a plane perpendicular to the core axis.

FIG. 1 shows a core N in a view in the plane perpendicular to the axis of rotation of the core. Said core has segments 10 which are divided into diverging segments 10d and reverse segments 10i. The transverse faces of the divergent segment 10d, and similarly 110d and 111d, are divergent outwards from the core. The transverse faces of the reverse segment 10i, and similarly 110i and 111i, are convergent outwards from the core N.

When the core is assembled, the transverse face 110d of a divergent segment 10d fits exactly against the transverse face 111i of the reverse segment 10i against which it is juxtaposed.

Locking means 11 are mounted on each of the segments 10 and allow said segments to be secured to a rim 20, in such a way as to keep the segments 10 in position throughout the tire building phase. The outer surface of the core forms the receiving surface S on which the products to be assembled to form the unfinished tire will be deposited directly in a winding process.

Figure 2:
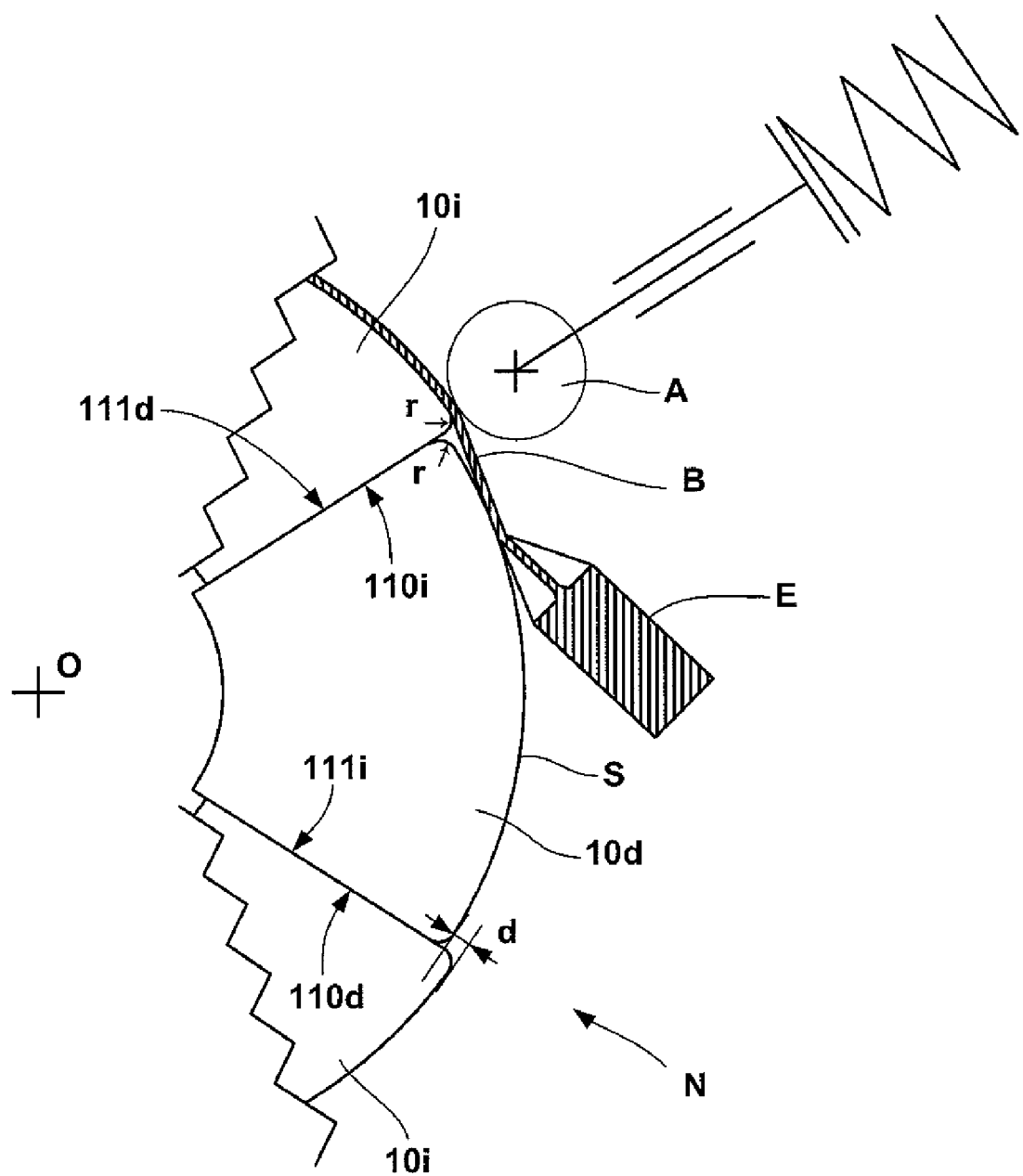
FIG. 2 is a close-up of the receiving surface at the joint formed by two transverse faces.

FIG. 2 is a view of a portion of the core N in a plane perpendicular to its axis of rotation O.

An extrusion means E deposits a band B of rubbery material directly on the surface S of the core N when the receiving surface S is moved relative to the extrusion means E. The band is formed from an airtight rubbery material and has a thickness of between 0.5 mm and 1 mm. The extrusion temperature is between 65° C. and 95° C. An application means A is used to conform the band to the surface S of the core N.

The radial misalignment d between a divergent segment 10d and a reverse segment 10i may be observed in FIG. 2. When this misalignment becomes too great, the phenomena of band breakage described above are observed. In practice, this misalignment can be between 0.1 mm and 2 mm without affecting the performance of the end product.

To avoid this problem, and for a portion 10d, the edges formed by the intersection of the transverse faces 110i and 111i with the receiving surface S have a radius r. Similarly, for the portion 10i, the connecting radius between the surface S and the transverse face 111d or between the surface S and the transverse face 110d is also equal to r.

This connecting radius is between 0.8 mm and 1.5 mm, and preferably approximately equal to 1 mm. The connecting radius must be great enough to reduce the cutting effect of the edge formed by the intersection between the receiving surface and the transverse face, but remain within tight limits so as not to create related problems such as the formation of undesirable indentations on the inside surface of the tire.

The radius can be made along all or part of the edge defined by the intersection between the transverse faces and the receiving surface. In practice the radius is interrupted 10 mm above the low region corresponding to the region of application of the band radially closest to the centre of the axis of rotation of the receiving surface.

In deciding the connecting radius r, consideration is given to the amplitude of the mean observed misalignment d. The greater this misalignment, the greater the radius r. However, it should be noted here that excessive misalignments d, in practice greater than 2 mm, can cause other anomalies of form in the building of the final tire. An intervention then becomes necessary to readjust the portions of the core with respect to each other, in order to get this misalignment within the acceptable tolerances again.

The solution proposed therefore makes it possible to avoid band breakage during application of the rubber forming the inside surface of the tire, yet allow a slight radial misalignment between the portions forming the receiving surface.

The invention claimed is:

1. A core defining at least partially a manufacturing form whose receiving surface, which is of essentially toroidal appearance, is designed to receive directly, by winding, profiled elements in the form of contiguous bands forming the inside surface of a tire, such core comprising a plurality of segments, each having transverse faces, said segments being circumferentially adjacent and arranged side by side, bearing against each other via their transverse faces, wherein a connecting radius between the transverse face and the receiving surface of a segment from among said plurality of segments is between 0.8 mm and 1.5 mm, along all or part of the length of the edge formed by the intersection of these two surfaces.

2. The core according to claim 1, wherein said connecting radius is equal to 1 mm.

3. The core according to claim 1, wherein the transverse faces of at least one segment are convergent radially outwards from the core.

4. The core according to claim 1, configured to serve as a means for moulding the inside surface of the tire.

* * * * *